United States Patent [19]

Tanaka et al.

[11] Patent Number: 5,228,635
[45] Date of Patent: Jul. 20, 1993

[54] APPARATUS HAVING A VACUUM CHAMBER FOR CONTROLLING A TAPE TENSION THEREOF/VACUUM CHAMBER APPARATUS FOR CONTROLLING TAPE TENSION

[75] Inventors: Masanori Tanaka; Masanori Wakabayashi; Toshimichi Fukuhara, all of Miyagi, Japan

[73] Assignee: Sony Corporation, Tokyo, Japan

[21] Appl. No.: 893,593

[22] Filed: Jun. 2, 1992

Related U.S. Application Data

[63] Continuation of Ser. No. 644,891, Jan. 23, 1991, abandoned.

[30] Foreign Application Priority Data

Jan. 26, 1990 [JP] Japan ................... 2-16371

[51] Int. Cl.⁵ ............................ B65H 59/36
[52] U.S. Cl. ................... 242/75.5; 242/182
[58] Field of Search .......... 242/75.5, 75.51, 75.52, 242/75.53, 75, 75.2, 182, 183, 185, 184

[56] References Cited

U.S. PATENT DOCUMENTS

| | | | |
|---|---|---|---|
| 3,143,312 | 8/1964 | Harper | 242/75.53 |
| 3,163,373 | 12/1964 | Darwin et al. | 242/75.53 |
| 3,310,062 | 3/1967 | Little | 242/75.2 |
| 3,462,659 | 8/1969 | Lee | 242/75.51 |
| 3,499,614 | 3/1970 | Badum | 242/182 |
| 3,673,473 | 6/1972 | Werner | 242/75.51 X |
| 3,701,494 | 10/1972 | Proulx | 242/75.51 X |
| 3,776,487 | 12/1973 | Henderson | 242/182 |
| 3,876,168 | 4/1975 | Powers, Jr. | 242/75.51 X |
| 3,888,480 | 6/1975 | Bagozzi | |
| 3,948,463 | 4/1976 | Godbout | |
| 4,344,690 | 8/1982 | Viehrig et al. | 242/75.51 X |
| 4,399,958 | 8/1983 | Dupont | 242/182 |
| 4,519,553 | 5/1985 | Campbell et al. | 242/56 R |
| 4,641,771 | 2/1987 | Masuch et al. | 242/75.51 X |
| 4,762,292 | 8/1988 | D'Anci | 242/75.52 X |

FOREIGN PATENT DOCUMENTS

| | | | |
|---|---|---|---|
| 1110546 | 4/1968 | Canada | 242/75.5 |
| 0025534A1 | 3/1981 | European Pat. Off. | |
| 0277717 | 8/1988 | European Pat. Off. | 242/75.5 |
| 0016866 | 10/1989 | European Pat. Off. | |
| 2089880 | 1/1972 | France | |
| 956403 | 9/1982 | U.S.S.R. | 242/75.51 |
| 975723 | 11/1964 | United Kingdom | 242/182 |
| 1109014 | 4/1968 | United Kingdom | |

OTHER PUBLICATIONS

IBM Technical Disclosure Bulletin vol. 12, No. 12, May 1970, "Reef Motor Control Circuit for Magnetic Tape Unit",-Rueger.

*Primary Examiner*—Daniel P. Stodola
*Assistant Examiner*—John P. Darling
*Attorney, Agent, or Firm*—Limbach & Limbach

[57] ABSTRACT

A tape tension control apparatus is applied to a tape winding apparatus for winding a magnetic tape into a tape cassette. In this apparatus, a tampered slot is formed on the back of a vacuum chamber, and the change of the tape position when the magnetic tape is wound into the tape cassette is detected as a change of pressure resulting from a change of the effective width of the slit. Therefore, a constant tape tension can be maintained during the winding process.

6 Claims, 3 Drawing Sheets

FIG. 2
FIG. 3
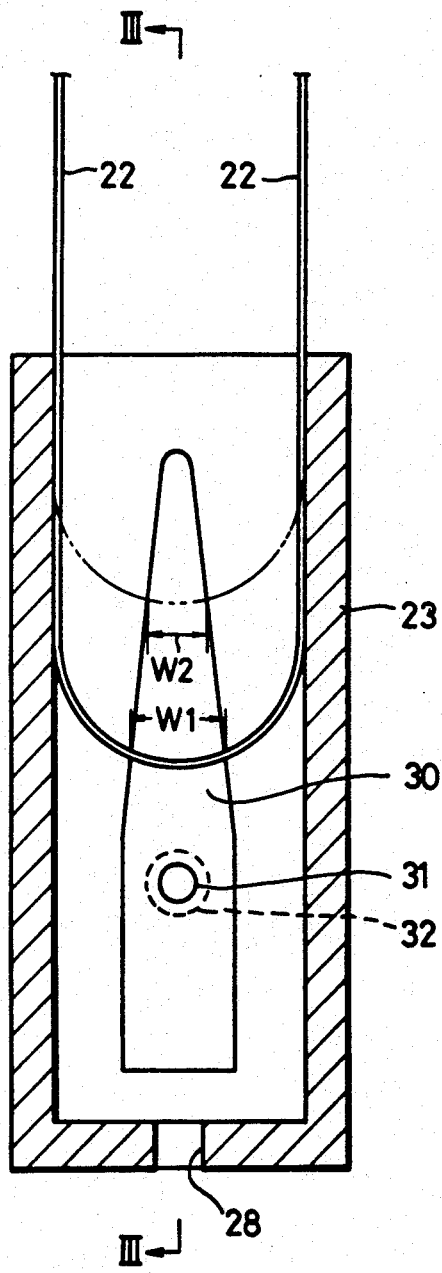
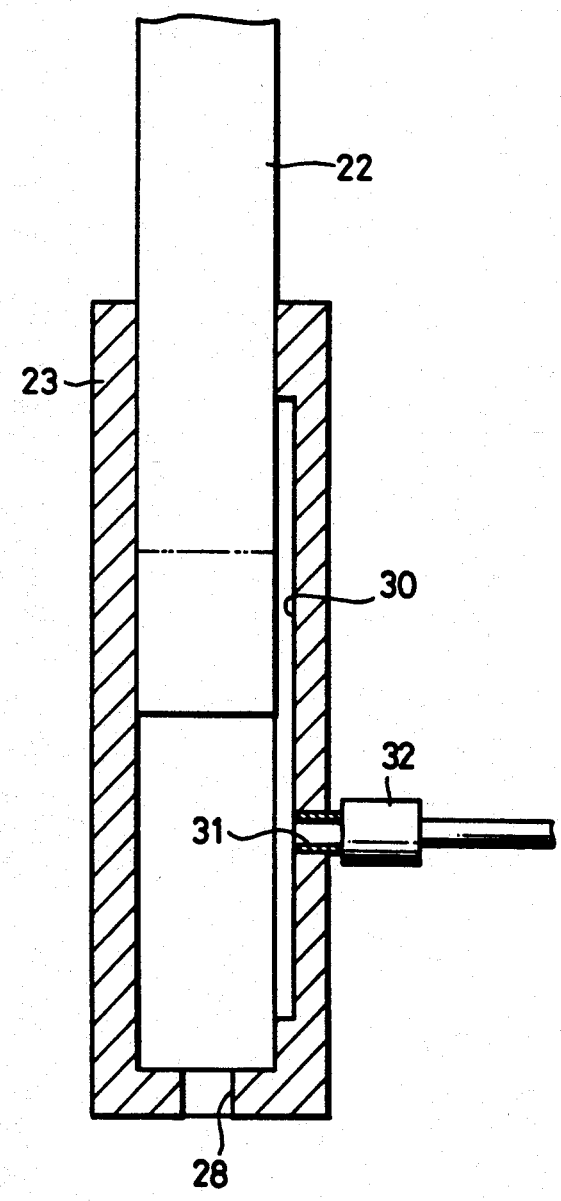

APPARATUS HAVING A VACUUM CHAMBER FOR CONTROLLING A TAPE TENSION THEREOF/VACUUM CHAMBER APPARATUS FOR CONTROLLING TAPE TENSION

This is a continuation of co-pending application Ser. No. 07/644,891 filed on Jan. 23, 1991, now abandoned.

BACKGROUND OF THE INVENTION

1. Field of the Invention

The present invention generally relates to apparatus for controlling a tape tension and, more particularly, is directed to an apparatus having a vacuum chamber for controlling a tape tension in which a slackened portion of a tape is introduced into a vacuum chamber and the tape is absorbed by a negative pressure within the vacuum chamber, thereby the tape being applied with a tension.

2. Description of the Prior Art

Conventionally, when a tape cassette is manufactured, a cassette casing and a magnetic tape are prepared independently and the magnetic tape is wound around a reel provided within the cassette casing by an apparatus described, for example, in Japanese Laid-Open Patent Gazette No. 63-300475. To be more concrete, a leader tape fixed to the reel within the cassette casing is cut and the magnetic tape is connected to an end portion of the thus cut leader tape. Then, the magnetic tape is wound around the reel by a predetermined amount by rotating the reel. After the magnetic tape is wound around the reel, the rear end of the magnetic tape is cut and connected to a free end of the leader tape connected to an opposite reel, thereby being wound within the tape cassette.

When the magnetic tape is wound within the tape cassette as set forth above, a tape tension of the magnetic tape must be kept at substantially a constant value. To this end, a tension arm is provided in the tape running path of the magnetic tape and the tension arm is rotated in response to the change of the magnetic tape so as to adjust the tape tension.

In such tape winding apparatus, the control operation for controlling a tape tension by the tension arm has a problem of a responsive characteristic. That is, if the magnetic tape is wound at high speed in order to increase productivity in winding the magnetic tape within the tape cassette, there is then the disadvantage that the tension arm cannot follow the change of the tape tension. Accordingly, the conventional tape winding apparatus utilizing the tension arm has a shortcoming that the tape winding speed is limited.

In order to remove the aforenoted disadvantages, it is proposed to wind the magnetic tape around the reels while a tension is applied to the magnetic tape by a vacuum chamber. However, the vacuum chamber is used to perform a constant tape tension control so that, when the tape tension is changed by the vacuum chamber, the pressure of the vacuum source must be changed. There is then the disadvantage that the change of tape tension during the winding process of the magnetic tape cannot be controlled.

OBJECTS AND SUMMARY OF THE INVENTION

Accordingly, it is an object of the present invention to provide an improved apparatus having a vacuum chamber for controlling a tape tension in which the aforenoted shortcomings and disadvantages encountered with the prior art can be substantially eliminated.

More specifically, it is an object of the present invention to provide an apparatus having a vacuum chamber for controlling a tape tension in which a tape tension during the tape winding process can be varied so as to become optimum.

It is another object of the present invention to provide an apparatus having a vacuum chamber for controlling a tape tension in which a control of the tape tension can be effected during to a high-speed tape winding process.

According to a first aspect of the invention, an apparatus for controlling the tension of a tape being wound by a tape winding mechanism includes a motor that applies a winding torque to the tape, and an elongate, rectangular vacuum chamber. The vacuum chamber receives the tape, and has a closed bottom and an open top through which the tape enters the vacuum chamber, and forms a loop therein. The loop of the tape divides the vacuum chamber into an upper portion, which extends between the open top of the vacuum chamber and the tape, and a lower portion between the tape and the closed bottom of the vacuum chamber.

The vacuum chamber also has closed sidewalls. One of the sidewalls has an elongate slot that extends towards the closed bottom of the vacuum chamber. The slot has an upper part and a lower part. The width of the upper part of the slot increases progressively to a maximum along the length of the slot in the direction towards the closed bottom of the vacuum chamber. The width of the lower part of the slot is substantially constant along the length of the slot, and is substantially equal to the maximum width of the upper part of the slot. The slot allows air to leak into the lower portion of the vacuum chamber. The width of the slot at the point at which the tape intersects the slot determines the amount of air leakage.

A device applies a vacuum to the lower portion of the vacuum chamber. A pressure measuring device measures the pressure change at one point in the lower part of the slot in response to the amount of air leakage. The pressure change indicates the position of the loop of the tape in the vacuum chamber. Finally, the apparatus includes a controller that responds to the pressure gauge. The controller controls the winding torque applied to the tape by the motor.

In a second aspect of the invention, an apparatus for winding magnetic tape onto a reel in a cassette includes a device that holds the cassette into which tape is to be wound, and a motor that applies a winding torque to the reel onto which the tape is to be wound. The apparatus also includes an elongate, rectangular vacuum chamber that receives the tape. The vacuum chamber has a closed bottom and an open top through which the tape enters the vacuum chamber, and forms a loop therein. The loop of the tape divides the vacuum chamber into an upper portion, which extends between the open top of the vacuum chamber and the tape, and a lower portion between the tape and the closed bottom of the vacuum chamber.

The vacuum chamber also has closed sidewalls. One of the sidewalls has a elongate slot that extends towards the closed bottom of the vacuum chamber. The slot has an upper part and a lower part. The width of the upper part of the slot increases progressively to a maximum along the length of the slot in the direction towards the closed bottom of the vacuum chamber. The width of the lower part of the slot is substantially constant along the length of the slot, and is substantially equal to the maximum width of the upper part of the slot. The slot allows air to leak into the lower portion oft eh vacuum chamber. The width of the slot at the point at which the tape crosses the slot determines the amount of air leakage.

A device applies a vacuum to the lower portion of the vacuum chamber. A pressure measuring device measures the pressure change at one point in the lower part of the slot in response to the amount of air leakage. The pressure change indicates the position of the loop of the tape in the vacuum chamber. Finally, the apparatus includes a controller that responds to the pressure gauge. The controller controls the winding torque applied to the tape by the motor.

The above, and other objects, features and advantages of the present invention will become apparent in the following detailed description of an illustrative embodiment thereof to be taken in conjunction with the accompanying drawings, in which like reference numerals are used to identify the same or similar parts in the several views.

BRIEF DESCRIPTION OF THE DRAWINGS

FIG. 2 is a longitudinal cross-sectional view of an embodiment of a vacuum chamber according to the present invention;

FIG. 3 is a cross-sectional view taken through the line III —III in FIG. 2; and

DETAILED DESCRIPTION OF THE PREFERRED EMBODIMENT

Figure 1:
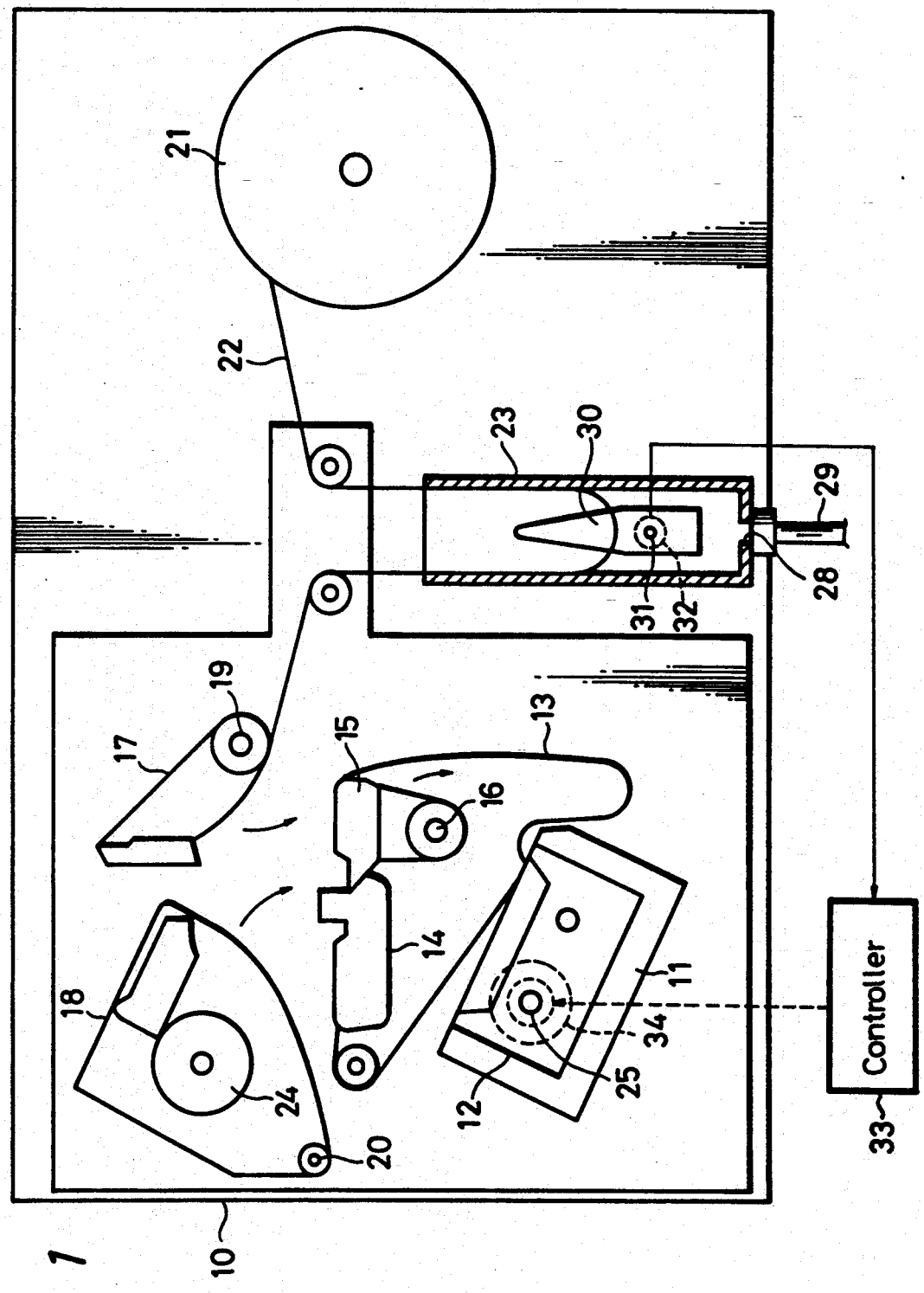
FIG. 1 is a front view illustrating the overall arrangement of a magnetic tape winding apparatus to which an embodiment of a tape tension control apparatus according to the present invention is applied.

Referring to the drawings in detail and initially to FIG. 1, there is shown a magnetic tape winding apparatus 10 to which an embodiment of a tape tension control apparatus according to the present invention is applied.

The tape winding apparatus 10 is provided at its front wall side with a tape holder 11 to which a tape cassette 12 is loaded. A magnetic tape is not yet wound within the tape cassette 12 but instead, only a leader tape 13 is wound within the tape cassette 12 in the condition such that it is fixed to two reels. A tape supporting unit 14 and a first splicing unit 15 are provided successively in the vicinity of the tape cassette 12. The tape supporting unit 14 is fixed position, whereas the first splicing unit 15 is rotatable about a rotary shaft 16 and can be spaced apart from the tape supporting unit 14.

Second and third splicing units 17 and 18 are provided above the tape supporting unit 14, and the second splicing unit 17 is made rotatable about a rotary shaft 19. The third splicing unit 18 is made rotatable about a rotary shaft 20 so that, when the second and third splicing units 17 and 18 are rotated about the rotary shafts 19 and 20, the are brought in contact with the tape supporting unit 14.

Further, this tape winding apparatus 10 is provided with a reel 21 of a large diameter, and a magnetic tape 22 is wound around the reel 21. The magnetic tape 22 withdrawn from the reel 21 is supplied to the second splicing unit 17 through a tension applying portion formed of a vacuum chamber 23, and a splicing tape is wound around a reel 24 on the third splicing unit 18.

The vacuum chamber 23 for applying tension to the magnetic tape 22 will be described with reference to FIGS. 2 and 3.

As shown in FIGS. 2 and 3, the vacuum chamber 23 is composed of a box of a rectangular solid configuration whose upper end is open, and a suction opening 28 is bored through the lower end wall of the vacuum chamber 23. This suction opening 28 is connected to a vacuum source (not shown) through a suction pipe 29 shown in FIG. 1.

Particularly, a slot 30 is formed within the vacuum chamber 23 as shown in FIG. 2. The slot 30 is formed on the bottom wall portion of the vacuum chamber 23 opposite one edge of the magnetic tape 22, and the upper portion of the slot 30 is shaped like an inverted letter V, so that the width thereof changes. The depth of the slot 30 is constant as shown in FIG. 3. A small aperture 31 is formed through the bottom wall of the vacuum chamber 23 opposite the slot 30 and a pressure gauge 32 is attached to the vacuum chamber 23 so as to communicate with the small aperture 31. As shown in FIG. 1, the pressure gauge 32 is connected to a controller 33 and the controller 33 controls the motor 34 which rotates the reel 25 of the tape cassette 12.

The winding operation for winding the magnetic tape by the magnetic tape winding apparatus 10 will be explained hereinafter.

When the magnetic tape 22 is wound within the tape cassette 12 shown in FIG. 1, the leader tape 13 is withdrawn from the tape cassette 12 loaded onto the cassette holder 11 and the thus withdrawn leader tape 13 is supplied to the tape supporting unit 14 and the first splicing unit 15. The leader tape 13 is cut by the first splicing unit 15 and one end portion and the other end portion of the thus cut leader tape 13 are supported by the tape supporting unit 14 and the first splicing unit 15.

Then, the first splicing unit 15 is rotated and made apart from the tape supporting unit 14. The second and third splicing units 17 and 18 are rotated to come in contact with the tape supporting unit 14, whereby the end portion of the magnetic tape 22 supplied to the second splicing unit 17 is connected to one end of the leader tape 13 supported by the tape supporting unit 14 by the splicing tape withdrawn from the third splicing unit 18.

Figure 4:
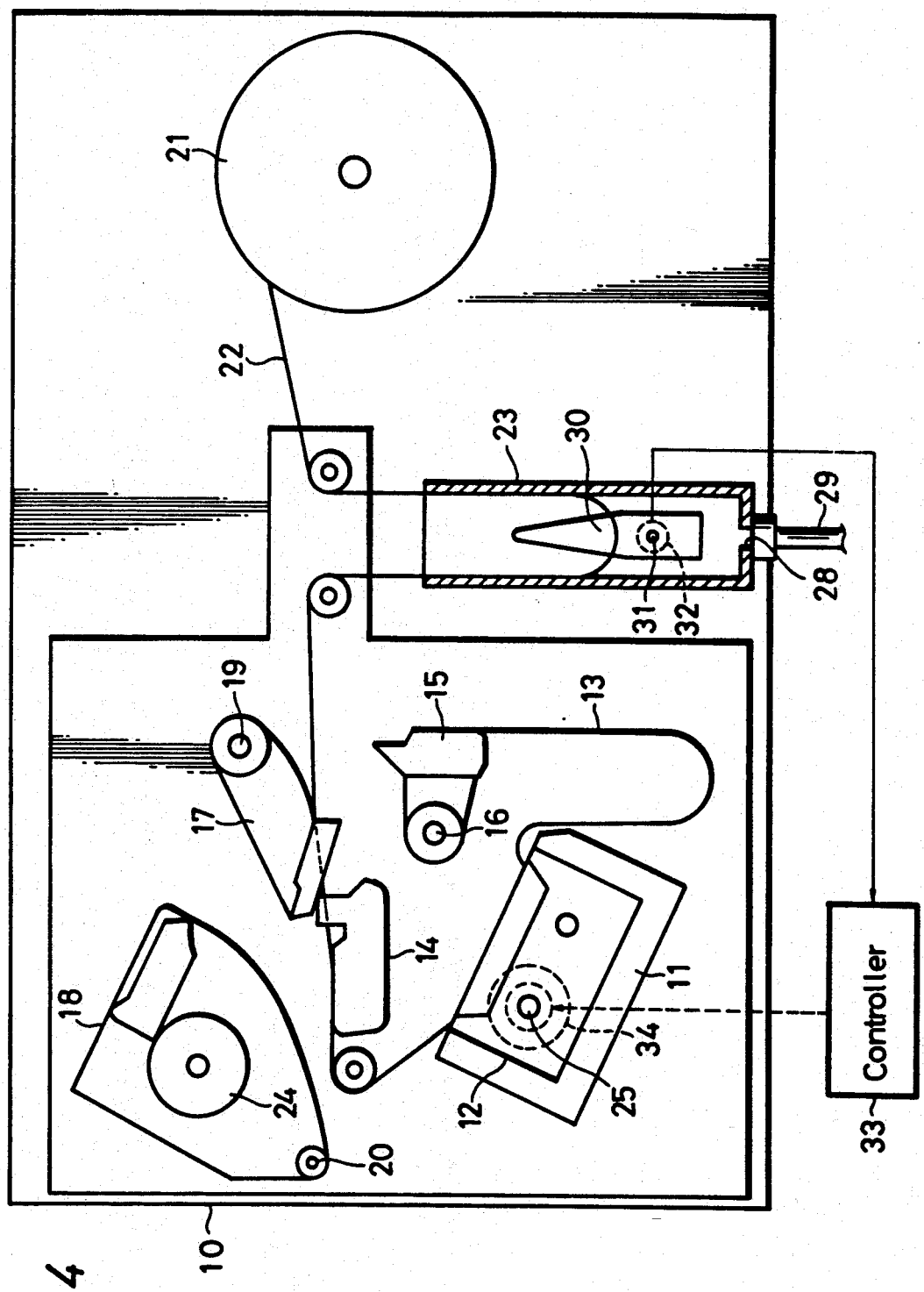
FIG. 4 is a front view of the overall arrangement of the magnetic tape winding apparatus, and to which references will be made in explaining the winding operation of a magnetic tape.

When the aforementioned connecting work is finished, as shown in FIG. 4, the third splicing unit 18 is returned to the original position and only the second splicing unit 17 is in contact with the tape supporting unit 14. Then, when the reel 25 of the tape cassette 12 is rotated at high speed by the motor 34, the magnetic tape 22 supplied from the reel 21 can be rewound by the reel 25. Incidentally, at that time, a predetermined tension is applied to the magnetic tape 22 by the vacuum chamber or tape tension applying portion 23, so that the magnetic tape 22 can be satisfactorily wound around the reel 25.

When the winding of the magnetic tape 22 around the reel 25 is finished, then the magnetic tape 22 is cut by the second splicing unit 17, and the thus cut magnetic tape 22 is supported at its end portion wound within the tape cassette 12 by the tape supporting unit 14. Thereafter, the second splicing unit 17 is rotated to the original position.

Then, the first and third splicing units 15 and 18 are rotated again to come in contact with the tape supporting unit 14, and the other end portion of the leader tape 13 supported by the first splicing unit 15 and the rear end portion of the magnetic tape 22 supported by the tape supporting unit 14 are connected together via the splicing tape. The thus connected tape is released from the tape supporting unit 14 and the first splicing unit 15 and the reel 25 of the tape cassette 12 is rotated to urge the tape to be completely wound within the tape cassette 12. In this fashion, the magnetic tape 22 is wound within the tape cassette 12 by the magnetic tape winding apparatus 10, thus the tape cassette in which the magnetic tape 22 is wound being completed.

An operation of the vacuum chamber 23 in which an optimum tension is always applied to the magnetic tape 22 when the magnetic tape 22 is wound within the tape cassette 12 will be explained below.

The tension of the magnetic tape 22 is controlled by the vacuum chamber 23 having the tapered slot 30 as follows. That is, during the magnetic tape 22 is wound within the tape cassette 12, the position of the loop of the magnetic tape 22 within the vacuum chamber 23 is detected as the change of vacuum pressure on the basis of the shape of the tapered slot 30, and this change of vacuum pressure is converted into an electrical signal by the pressure gauge or pressure sensor 32. Thus, the motor 34, which rotates the reel 25, is controlled by the controller 33 in response to the detection by the pressure sensor 32, whereby the tension of the magnetic tape 22 during the winding can be changed so as to become optimum.

Since widths W1 and W2 of the positions at which the magnetic tape 22 crosses the slit 30 are different from each other between the position of the magnetic tape 22 shown by a solid line and the position shown by a two-dot chain line in FIG. 2 even when the vacuum pressure within the vacuum chamber 23 which is absorbed via the suction pipe 28 is constant, the amounts of air leaked through the slot 30 are different so that the pressure sensor 32 can detect the change of pressure corresponding to the amount of air leaked through the slot 30. Then, the output of the pressure sensor 32 is fed back to the winding-side motor 34, whereby the position of the magnetic tape 22 within the chamber 23 can be controlled. In that event, it is to be appreciated that to control the position of the magnetic tape 22 is the same as controlling the tension of the magnetic tape 22 during the winding process.

In accordance with this embodiment, the vacuum chamber 23 is provided with the tapered slot 30 which is used to detect the change of the position of the loop of the magnetic tape 22 as the change of pressure. Accordingly, in this tape tension control apparatus utilizing the vacuum chamber 23, the tension of the magnetic tape 22 can be changed so as to become optimum during the winding process. Further, since the problem of follow-up property encountered with the conventional rotating type tension arm is removed, the magnetic tape 22 can be wound within the tape cassette 12 at high speed by the magnetic tape winding apparatus 10 shown in FIG. 1, which can improve productivity in the manufacturing process or the tape cassette.

As described above, according to the present invention, the tapered slot is formed on the inner surface of the vacuum chamber with the edge of the magnetic tape across its width, and also the effective width of the slit is changed in response to the amount of the magnetic tape in the vacuum chamber. As a consequence, the amount of air leaked through the slot changes in response to the of the magnetic tape and the pressure, which changes in response to the amount of air leaked through the slot is detected by the pressure gauge or pressure sensor. Thus, the tape tension can be controlled so as to become optimum without changing the pressure of the vacuum chamber. Furthermore, since the tape tension control apparatus of the present invention has no movable portion unlike the conventional tension arm, the problem of the follow-up property of the tension arm can be removed and hence, the tape tension can be varied in response to the high-speed tape winding.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. Apparatus for controlling the tension of a tape being wound by a tape winding mechanism, the apparatus comprising:

motor means for applying a winding torque to the tape;

an elongate, rectangular vacuum chamber, receiving the tape, and including
 a closed bottom,
 an open top through which the tape enters the vacuum chamber, and forms a loop therein, the loop of the tape dividing the vacuum chamber into an upper portion between the open top and the tape, and a lower portion between the tape and the closed bottom, and
closed sidewalls, one of the sidewalls having an elongate slot that extends towards the closed bottom, the slot having an upper part and a lower part, the upper part having a width that increases progressively to a maximum along the length of the slot in the direction towards the closed bottom of the vacuum chamber, the lower part having a width that is substantially constant along its length and is substantially equal to the maximum width oft eh upper part, the slot allowing air to leak into the lower portion of the vacuum chamber, the width of the slot at the point at which the tape crosses the slot determining the amount of air leakage;

means for applying a vacuum to the lower portion of the vacuum chamber;

pressure measuring means for measuring pressure change at one and only one point in the lower part of the slot in response to the amount of air leakage, the pressure change indicating the position of the loop of the tape in the vacuum chamber; and control means for controlling the winding torque applied to the tape by the motor means in response to the pressure measuring means.

2. The apparatus of claim 1, wherein
the means for applying a vacuum to the lower portion of the vacuum chamber applies a tension to the loop of the tape, draws the loop of the tape into the vacuum chamber, changing the width of the slot at the point at which the tape crosses the slot, and the amount of air leakage, whereby the pressure change indicates the position of the loop of the tape in the vacuum chamber, and the control means is connected to the pressure measuring means and additionally controls the winding torque applied to the tape by the motor means in response to the pressure measuring means to maintain the loop of the tape in a substantially constant position in the vacuum chamber.

3. Apparatus for winding magnetic tape onto a reel in a cassette, comprising:

means for holding the cassette into which tape is to be wound;

motor means for applying a winding torque to the reel;

an elongate, rectangular vacuum chamber, receiving the tape, and including a closed bottom, an open top through which the tape enters the vacuum chamber, and forms a loop therein, the loop of the tape dividing the vacuum chamber into an upper portion between the open top and the tape, and a lower portion between the tape and the closed bottom, and closed sidewalls, one of the sidewalls having an elongate slot that extends towards the closed bottom, the slot having an upper part and a lower part, the upper part having a width that increases progressively to a maximum along the length of the slot in the direction towards the closed bottom of the vacuum chamber, the lower part having a width that is substantially constant along its length and is substantially equal to the maximum width of the upper part, the slot allowing air to leak into the lower portion of the vacuum chamber, the width of the slot at the point at which the tape crosses the slot determining the amount of air leakage;

means for applying a vacuum to the lower portion of the vacuum chamber;

pressure measuring means for measuring pressure change at one and only one point in the lower part of the slot in response to the amount of air leakage, the pressure change indicating the position of the loop of the tape in the vacuum chamber; and control means for controlling the winding torque applied to the reel by the motor means in response to the pressure measuring means.

4. The apparatus of claim 3, wherein the means for applying a vacuum to the lower portion of the vacuum chamber applies a tension to the loop of the tape, draws the loop of the tape into the vacuum chamber, changing the width of the slot at the point at which the tape crosses the slot, and the amount of air leakage, whereby the change in pressure indicates the position of the loop of the tape in the vacuum chamber, and the control means is connected to the pressure measuring means and additionally controls the winding torque of the motor means in response to the pressure measuring means to maintain the loop of the tape in a substantially constant position in the vacuum chamber.

5. The apparatus of claim 4, wherein the cassette includes a first reel and a second reel, the first reel having a piece of leader tape fixed to it, and the second reel having a piece of leader tape fixed to it, and the apparatus further comprises:

means for attaching the magnetic tape to the leader tape fixed to the first reel before the magnetic tape is wound into the cassette, and means for attaching the magnetic tape to the leader tape fixed to the second reel after the magnetic tape is wound into the cassette.

6. The apparatus of claim 3, wherein the cassette includes a first reel and a second reel, the first reel having a piece of leader tape fixed to it, and the second reel having a piece of leader tape fixed to it, and the apparatus further comprises:

means for attaching the magnetic tape to the leader tape fixed to the first reel before the magnetic tape is wound into the cassette, and means for attaching the magnetic tape to the leader tape fixed to the second reel after the magnetic tape is wound into the cassette.

* * * * *